(12) United States Patent
Zaychuk et al.

(10) Patent No.: US 6,230,438 B1
(45) Date of Patent: May 15, 2001

(54) WATER INSOLUBLE, FREEZE SENSITIVE SEED COATINGS

(75) Inventors: Kevin S. Zaychuk, Edmonton (CA); Nicholas Enders, Raleigh, NC (US)

(73) Assignee: Grow Tec Inc., Nisku (CA)

( * ) Notice: Subject to any disclaimer, the term of this patent is extended or adjusted under 35 U.S.C. 154(b) by 0 days.

(21) Appl. No.: 09/399,583

(22) Filed: Sep. 20, 1999

(51) Int. Cl.[7] ............... A01C 1/06; A01N 25/06
(52) U.S. Cl. ............... 47/57.6; 71/64.07; 504/100
(58) Field of Search .............. 47/57.6; 71/64.07, 71/64.11; 504/100; 427/213.36

(56) References Cited

U.S. PATENT DOCUMENTS

| | | |
|---|---|---|
| 3,545,129 | 12/1970 | Schreiber et al. . |
| 3,698,133 * | 10/1972 | Schreiber .............. 47/57.6 |
| 3,803,761 * | 4/1974 | Watts et al. .............. 47/57.6 |
| 3,947,996 | 4/1976 | Watts . |
| 4,256,785 * | 3/1981 | Dannelly .............. 427/222 |
| 4,562,663 | 1/1986 | Redenbaugh . |
| 4,583,320 | 4/1986 | Redenbaugh . |
| 4,715,143 | 12/1987 | Redenbaugh et al. . |
| 4,771,089 * | 9/1988 | Ofstead .............. 524/41 |
| 4,779,379 | 10/1988 | Redenbaugh . |
| 5,087,475 * | 2/1992 | Bazin et al. .............. 427/4 |
| 5,106,648 | 4/1992 | Williams . |
| 5,127,186 | 7/1992 | Kreitzer . |
| 5,129,180 * | 7/1992 | Stewart .............. 47/57.6 |
| 5,130,171 * | 7/1992 | Prud'Homme et al. ........ 427/213.36 |
| 5,300,127 | 4/1994 | Williams . |
| 5,746,022 | 5/1998 | Brown et al. . |
| 5,876,739 | 3/1999 | Turnblad . |

FOREIGN PATENT DOCUMENTS

| | | |
|---|---|---|
| WO 97/25477 | 7/1997 | (WO) . |
| WO 98/25710 | 6/1998 | (WO) . |

OTHER PUBLICATIONS

"Standard Terminology Relating to Thermophysical Properties" in *ASTM Designation: E1142–93b*, pp. 700–705 (Jan. 1994).

"Standard Test Method for Glass Transition Temperatures by Differential Scanning Calorimetry or Differential Thermal Analysis" in: *ASTM Designation: E1356–91 (Reapproved 1995)*, pp. 851–854 (Apr. 1991).

"Standard Test Methods for Water Vapor Transmission of Organic Coating Films" in: *ASTM Designation: D 165–93*, pp. 180–183 (Feb. 1994).

"Manufacture of Coated Seed With Delayed Germination", *Can. J. Plant Sci*, 47(1967) Notes:455–456.

Brown, D. Ian, "10 Year Progress Report on Coated Seed Development," Dept. of Plant Science, University of Manitoba, pp. 1–9 (Mar. 17, 1978).

* cited by examiner

*Primary Examiner*—Peter M. Poon
*Assistant Examiner*—Son T. Nguyen
(74) *Attorney, Agent, or Firm*—Townsend and Townsend and Crew LLP

(57) ABSTRACT

This invention provides for seed coatings which comprise water insoluble polymers which absorb water, resist passage of water and are freeze labile. The seed coatings are useful for fall planting in cold climates.

31 Claims, No Drawings

WATER INSOLUBLE, FREEZE SENSITIVE SEED COATINGS

CROSS-REFERENCES TO RELATED APPLICATIONS

[Not Applicable].

STATEMENT AS TO RIGHTS TO INVENTIONS MADE UNDER FEDERALLY SPONSORED RESEARCH AND DEVELOPMENT

[Not Applicable].

FIELD OF THE INVENTION

This invention relates to improved seed coatings for agriculture.

BACKGROUND OF THE INVENTION

This invention provides for seed coatings which comprise water insoluble polymers which absorb water, resist passage of water and are freeze labile. The seed coatings are useful for fall planting in cold climates.

SUMMARY OF THE INVENTION

This invention provides for a seed coated in a continuous, adherent water impervious coating to control germination until after exposure to freezing temperatures said coating comprising a water insoluble polymer having the following properties:

i. a glassification temperature of about 20° C. to about 0° C.;
ii. a water absorptivity value of at least 15% w/w after 24 hours; and
iii. a moisture vapor transmission rate of less than 200 gms per square meter per 24 hours; wherein the coating prevents the seed from imbibing water until the ambient temperature reaches the glassification temperature of the polymer and the absorbed water freezes and fractures the seed coating rendering it water permeable upon exposure to temperatures above 0° C. The polymer preferably has a glassification temperature of about 15° C. The preferred polymer has a water absorptivity value of at least 50% w/w, such as a water absorptivity value of at least 50% to 90% w/w. The polymer preferably has a moisture vapor transmission rate is about between 130 to 150 gms per square meter.

The preferred polymers are selected from the group consisting of styrene-acrylics, styrene butadienes, styrene-nitrile butadienes and vinyl acetate ethylenes.

The seeds suitable for use in this invention include the following plants: Brassica spp. *Medicago sativa,* Melilotus spp., Trifolium spp., *Glycine max, Lens esculenta, Pisum sativum, Cicer arietinum,* Phaseolus spp., Triticum spp., Hordeum spp., *Secale cereale,* X Triticosecale Wittmack), *Carum carvi, Phalaris canatiensis, Coriandrum sativum* L., Lolium spp., *Zea mays,* and Avena spps.

The seed coatings may include Rhizobium inoculum, fungicide, fertilizer and insecticide.

This invention further provides for a method of inhibiting germination in a seed by enveloping the seed in a continuous, water impervious coating comprising a water insoluble polymer having the properties set forth above.

In addition to a method of inhibiting germination this invention provides for a method for fall planting of cold weather plants said method comprising the step of planting seed in a field two weeks prior to the expected date of the first hard freeze wherein the seed is coated with a continuous water impervious film comprising a water insoluble polymer having the properties set forth above.

DETAILED DESCRIPTION

Introduction

This invention involves the novel use of a polymer as a seed coating for seeds that are to be planted in fall for spring germination. Such seed are expected to survive freezing winter temperatures and to reliably germinate. The coating of this invention are sufficiently water impermeable that they fully prevent the seeds from germinating under normal conditions. The coatings are able to absorb water into their structure without passing sufficient water through to the seed to begin germination. Upon freezing, the water in the coat proteins expand or form crystals that induce mechanical shear on the coat and create micro fracturing. Upon return of the seed to temperatures above freezing, water passes through the fractures and germination begins.

The advantage of such films is that the seed can be planted in fall and germination will reliably begin in early spring when conditions might not readily permit equipment into the fields.

Definitions

"Cool season or weather plants" refers to plants that can germinate, grow, flower and mature at temperatures below 25° C. Examples include wheat and canola.

"Continuous" in the context of seed coating refers to a coating that has no breaks exposing the seed surface ambient moisture sufficient to initiate the germination process.

"Dye" is a colorant that is added to the mixture of chemicals that form the seed coating.

"Expected date of soil freeze up" is the predicted date upon which the soil surface remains frozen throughout the day.

"Fertilizer" refers to macro and micro nutrients needed for healthy plant growth.

"Fungicide" refers to chemical compositions that inhibit the growth of fungal plant pathogens.

"Germination" refers to the period of time following seed dormancy when physiological and physical changes undergone by a seed immediately prior to the first indications of growth.

"Glassification or glass transition temperature" refers to that temperature at which a polymer changes from a viscous or rubber condition to a hard and relatively brittle one.

"Moisture vapor transmission rate" refers to the rate at which water passes through a polymer film.

"Opacity agents" refers to agents that reduce the transparency of the seed coating.

"Pesticide" refers to a composition that affects the viability or a plant pathogen including insects, fungi, bacteria and nematodes.

"Polymer" a chemical composition with repeating units. The units may be identical units or units having a predictable percentage of similar components.

"Rhizobium inoculum" refers to a composition comprising bacteria from the genera of Rhizobium.

"Styrene-acrylics" refers to a polymer which comprises both stryene and acrylic monomers.

"Styrene butadienes" refers to a polymer which comprises both stryene and butadiene monomers.

"Styrene-nitrile butadienes" refers to a polymer which comprises styrene, acrylonitrile and butadiene.

"Vinyl acetate ethylenes" refers to a polymer which comprises both vinyl acetate and ethylene (bivinyl) monomers.

"Water insoluble" refers to a polymer that is not solvated in water or does not disperse on a molecular level in water. Functionally, a water insoluble polymer is one from which no more than 5% of any individual polymer component is extractable by hot water (150° F.).

"Water impervious" refers to a polymer film that is sufficiently impassable to water that seed dormancy is maintained where a seed is coated with the film as compared to an uncoated seed.

"Water permeable" in the context of a seed coating refers to a polymer film that is allows sufficient moisture to pass that seed dormancy in a seed coated with the water permeable film is ended and germination can begin.

Polymers of Use in the Invention

The physical characteristics of the polymers for use in this invention are provided above. The preferred polymers are latex. Latex is a general term for a stable emulsion of polymers in water. The term includes butadiene and styrene copolymers (elastomeric), stryene-butadiene copolymers (resinous), butadiene with styrene and acrylonitrile, chloroprene copolymers, methacrylate and acrylate ester copolymers, vinyl acetate copolymers, vinyl and vinylidene chloride copolymers, ethylene copolymers, fluorinated copolymers, acrylaminde copolymers, stryrene-acrolein copolymers, and pyrrole and pyrrole copolymers. These polymers can be modified to have active groups such as carboxy groups.

Additives include surfactants, initiators, stabilizers, cross linkers, antioxidants, UV stabilizers, reducing agents, colorants and plasticizers.

Latices are produced by emulsion polymerization. Emulsion polymerization is a process by which the monomers are present in an aqueous suspension as small beads of 0.05 to 5 nm. The monomers are permitted to interact with micelle bodies (surfactants) to form globules. The globules serve as a reservoir of monomers for the polymerization that takes place in the aqueous phase. In the presence of an initiator, the monomers polymerize into polymeric particles.

Because this invention depends on the physical properties of the polymers it is not possible to provide a single set of conditions which adequately serves to produce a suitable polymer. The properties of the plastics will depend on the monomers used, the conditions under which the emulsions of formed and the additives.

One large family of latex compounds is preferred. They are low surfactant, high moisture barrier polymers described in WO 97/25477 which is incorporated by reference herein. In general, one should use one of the following polymers polyvinyl chloride, vinyl chloride-acrylonitrile, polyacrylonitrile, polystyrene and polyamide as a principle monomer. An aryl-vinyl monomer is preferred. The surfactant should be kept below 1% and a mono or dicarboxylic acid monomer can be added such as acrylic or itaconic acid.

Commercial styrene butadiene available emulsion polymers for practicing this invention are: Tylac® 96069 (a styrene butadiene rubber), Tykote® 2200 (a styrene butadiene rubber) Tylac® 68914 (a styrene butadiene rubber), and Synthemul® 68566 (a styrene-acrylic polymer). These polymers are available from Reichhold Chemicals in North Carolina.

Assaying For Polymers of Use in This Invention

The polymers of this invention have to pass three criteria. The criteria are defined by standard testing procedures. These procedures are published by the American Society for Testing and Materials [ASTM].

1. Standard Test Method for Glass Transition Temperatures E 1356-91

The glass transition is manifested as a step change in specific heat capacity. The glass transition temperature (Tg) of a specimen is determined by recording the heating curve for a specific specimen, as the specimen is heated at a rate of 20° C./min, and that until all the desired transitions have occurred. The measures can be performed using either a differential scanning calorimeter or a differential thermal analyzer. The midpoint temperature (Tm) can then be determined and taken to be the Tg. Tm is the point on the thermal curve corresponding to ½ of the heat flow difference between the extrapolated onset and the extrapolated end.

To remove any previous thermal history that could affect the measures, an initial thermal cycle can be performed prior to the test, in flowing nitrogen or air environment. For that, the specimens are heated at a rate of 20° C./min to a temperature at least 20° C. above the temperature of return to baseline (Tr), and then cooled at the same rate to 50° C. below the transition temperature of interest, and maintained at that temperature until an equilibrium is achieved, before reheating them for determining the Tg.

2. Standard Test Methods For Water Vapor Transmission D 1653-93

The method used to determine the water vapor transmission rate (WVT) is the Wet Cup Method, which is the preferred method for materials used under conditions where relative high humidities are anticipated.

The specimen is sealed over the mouth of a cup or dish filled with Water, following a procedure in accordance with ASTM D 1653-93. The loaded cups are weighed and then placed in a chamber, or cabinet, with controlled temperature and relative humidity. The cups are then periodically weighed, over a period of at least three weeks, until the weight change versus time becomes constant. In a plot of the weight change against the elapsed time, the slope of the straight line corresponds to the WVT. The water vapor permeance, WVP, can be calculated as WVT/$\Delta$p, where $\Delta$p is the pressure difference between the two surfaces of a coating.

3. Standard Test Method For Water Absorption of Plastics D 570-95

After being conditioned by drying, following a protocol in accordance with ASTM D-570-95, the specimens (at least three) are weighed and then immersed in water at a given temperature and for variable amounts of time, depending on their rate of absorption. The surface water is then removed and the specimens are weighed. The Increase in Weight is expressed as a percentage corresponding to the ratio of the difference between the Wet Weight and the Conditioned Weight to the Conditioned Weight, multiplied by 100 (I).

If the materials have water-soluble ingredients, the water-soluble matter weight is determined by reconditioning the materials, after the water immersion procedure, and determining the difference between the weight of the initially conditioned material and that of the reconditioned material. The Soluble Matter Loss is expressed as a percentage corresponding to the ratio of the difference between the Conditioned Weight and the Reconditioned Weight to the Conditioned Weight, multiplied by 100 (II).

The percentage of Water Absorbed is the sum of (I)+(II).

Cool Season Plants

Cool season plants are preferred plants for use in this invention. Such plants include Brassica spp. (*Brassica rapa, Brassica napus, Brassica juncea*), small-seeded legumes (*Medicago sativa,* Melilotus spp., Trifolium spp.), large-seed legumes (*Glycine max, Lens esculenta,* and *Pisum sativum, Cicer arietinum,* and Phaseolus spp.), cereal grains (Triticum spp., Hordeum spp., *Secale cereale,* and X Triticosecale Wittmack), specialty crops (*Carum carvi, Phalaris canatiensis, Coriandrum sativum* L.), *Zea mays,* Avena spps., and ryegrass (Lolium spp.)

Methods for Coating Seeds With Polymers of This Invention

Unless otherwise stated all ratios are weight to weight. To produce a seed coating of this invention, one adds 50–75 parts polymer, 25–35 water, 1–5 parts opacity agent and 0.05–1.5 parts colorant to 400–600 parts seed in a seed blending or mixing machine and uniformly mixes until a free flowing mixture is produced.

The opacity agents can be selected from those with a high refractive index such as diatomaceous earth, silica, calcium carbonate, barytes, clay, magnesium silicate, lithopone, zinc oxide, antimony oxide, zinc sulfide, titanium dioxide (anatase) or titanium dioxide (rutile). The colorants can be either organic or inorganic and should be non-toxic. Examples of organic colorants are azo dyestuffs and phthalocyanine blues and greens. Examples of inorganic colorants are titanium dioxide (white) or ochers (yellow) and iron oxides (red). The colorant is preferably a dye and can be selected from the group of acetate dyes, anthraquinone dyes, acid dyes or azo dyes.

The seed and coating are mixed in any of a variety of seed coating apparatus. The rate of rolling and application of coating depends upon the seed. For canola, it is best if a rotating type coating pan is used with sufficient RPM to maintain a rolling action of the seed along the sides of the pan allowing uniform coverage and compaction of the applied polymer. The polymer solution must be applied over a period of time to allow sufficient drying between applications to minimize blocking or clumping of the seed. An increased rate of application can be facilitated by using forced air in the coating pan which is preferably heated. After applying a sufficient amount of polymer to completely encapsulate the seed, the seed must be cooled to minimize blocking in the bin or bag.

In addition to the polymer coating, the seed coating may include, but is not limited to the following additives; seed protectants (insecticide or fungicide), plant nutrients (macro or micronutrients), growth hormones and the like and non-plant nutrients (i.e. selenium).

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

EXAMPLES

The following examples are provided by way of illustration only and not by way of limitation. Those of skill will readily recognize a variety of noncritical parameters which could be changed or modified to yield essentially similar results.

Example 1

Preparation of the Seed Coating By Addition of Additives and Coating of Canola Seeds A rotary type coating pan is charged with 1 kg of canola seed. The canola seed is rotated in the mixing chamber, while a stream of air, preferably heated at a temperature of 70° C. is introduced and passed through the seed at a flow rate of 55 cfm.

The selected seed treatment (insecticide, fungicide, etc.) is first applied to the seed at manufacturers' recommended rate. Immediately after the selected seed treatment, the formulated polymer, consisting of 100 parts Tykote® 2200C polymer a styrene butadiene rubber, 50 parts water, 5 parts opacity agent and 1 part colorant is applied to the one kilogram of canola seed, up to the saturation point. The application is then stopped to allow the coating to dry to the point where the seed flows freely in the coating pan. The same application procedure is repeated a series of times, each using an equal volume of polymer, until a coating percentage of 7.2% is produced.

Immediately following the final application, the seed is allowed to remain in the vessel for 2–4 minutes to dry. Finally, an anti-caking agent, diatomaceous earth, silica, calcium carbonate, or magnesium silicate, is added, at a rate of 0.1% weight/weight. The seed is then removed and allowed to cool.

Example 2

In vitro Experiments Demonstrating Effectiveness of the Seed Coating

In the following examples, seeds of canola cv. Quest coated with polymers for fall seeding were compared to bare seed controls in regards to germination at 15° C. and 8° C., and seed viability following storage at −6° C. and −12° C. for 60 days.

Seed coating designations are G8-0910-3 and G8-0612-5 contain Tykote® 2200C (styrene butadiene rubber) and G8-0910-6 contains Tykote® 1004 (styrene butadiene rubber). The Tykote polymers are available from Reichhold Chemical Co. in North Carolina.

Germination at 15 and 8° C.

To test the germination rate in the absence of storage at freezing temperatures, twenty seeds per petri dish (replicated 3×) were incubated at 15° C. and 8° C. under moist conditions. Percent germination results are provided in tables 1 and 2.

TABLE 1

Percent germination over time of canola cv. Quest seeds @ 15° C. in petri dishes.

| Treatment | Days @ 15° C. | | | | | | |
|---|---|---|---|---|---|---|---|
| | 2 | 4 | 6 | 7 | 8 | 9 | 10 |
| Control | 91 | 100 | 100 | 100 | 100 | 100 | 100 |
| G8-0612-5 | 0 | 5 | 11 | 23 | 36 | 41 | 50 |
| G8-0910-3 | 0 | 0 | 0 | 3 | 6 | 11 | 15 |
| G8-0910-6 | 0 | 6 | 24 | 20 | 36 | 36 | 41 |

TABLE 2

Percent germination over time of canola cv. Quest seeds @ 8° C. in petri dishes.

| Treatment | Days @ 8° C. | | | | | | |
|---|---|---|---|---|---|---|---|
| | 2 | 4 | 6 | 7 | 8 | 9 | 10 |
| Control | 60 | 100 | 100 | 100 | 100 | 100 | 100 |
| G8-0612-5 | 0 | 13 | 18 | 20 | 30 | 48 | 65 |
| G8-0910-3 | 0 | 0 | 0 | 3 | 10 | 13 | 21 |
| G8-0910-6 | 0 | 1 | 5 | 5 | 16 | 31 | 48 |

The number of seeds that germinated were determined every second day. Approximately 90% of the uncoated seeds germinated after 2 days at 15° C. whereas less than 15% and 40% of the seeds treated with test coatings G8-0910-3 and G8-0910-6 germinated after 9 days, respectively (Table 1). Similar but prolonged germination periods were observed at 8° C. (Table 2).

The Effect of Sub-Zero Temperatures on Seed Viability

To test for the ability of the coatings to permit seed germination after to freeze treatment, coated and bare seeds were first sown in moist, sterile soil under laboratory conditions under non-freezing conditions. The seeds were first incubated in a growth chamber for 0, 2, 4, 8, 12 and 16 days at either 8° C. (Table 3) or 15° C. (Table 4). Any treatment that produced seedlings that emerged from the soil was not included in the sub-zero treatment study. Following incubation, the pots were incubated in a growth chamber at −6° C. for 60 days. The temperature was then raised to non-freezing levels and seedling emergence determined every second day for 12 days at 20° C./15° C. (light/dark) with a 16 hour photoperiod.

TABLE 3

Percent emergence after 12 days of Canola cv Quest seedlings @ 20/15° C. following storage at −6° C. for 60 days. Seeds were imbibed @ 8° C. for 2, 4, 8, 12 and 16 days.

| Treatment | Pre-freezing incubation (days) @ 8° C. | | | | | |
|---|---|---|---|---|---|---|
| | 0 | 2 | 4 | 8 | 12 | 16 |
| Control | 70 | 45 | 33 | 11 | — | — |
| G8-0612-5 | 100 | 100 | 90 | 73 | 58 | 43 |
| G8-0910-3 | 100 | 100 | 100 | 100 | 100 | 100 |
| G8-0910-6 | 100 | 100 | 100 | 100 | 100 | 100 |

TABLE 4

Percent emergence after 12 days of Canola cv Quest seedlings @ 20/15° C. following storage at −6° C. for 60 days. Seeds were imbibed @ 15° C. for 2, 4, 8, 12 and 16 days.

| Treatment | Pre-freezing incubation (days) @ 15° C. | | | | |
|---|---|---|---|---|---|
| | 2 | 4 | 8 | 12 | 16 |
| Control | 53 | 35 | 15 | — | — |
| G8-0612-5 | 55 | 43 | 40 | 48 | 10 |
| G8-0910-3 | 100 | 100 | 83 | 85 | 76 |
| G8-0910-6 | 100 | 100 | 100 | 81 | 68 |

All three coatings had a positive effect on survival of the seeds compared to uncoated control seed. Control (bare seed) imbibed for 2 days at 15° C. had a 50% survival rate and uncoated seed imbibed for longer periods did not survive. Coated seed had a 40 to 100% survival rate after a week seeds coated with G8-910-3 had over an 80% survival rate even after 16 days.

Example 3

Field Trials of the Coating

With several of the coatings from the germination studies as outlined above, field trials were initiated. The following are two examples of field performance from two separate locations:
Edmonton, Alberta
Grow Tec Inc (University of Alberta Edmonton Research Station)

This location consisted of a 12 treatment randomized complete block which was replicated four times. For clarity, only treatments 1 and 2 are reported here. The treatments consisted of one check (GuardCoat, the standard Grow Tec Coating for spring-seeded canola) and a 'fall seed' polymer coating. All treatments used the RoundupReady canola variety Quest treated with Apron. Due to the satisfactory performance of treatment number 2, the polymer coating containing Tykote 2200C was named Extender™ during the course of this study.

Small plot trials were seeded weekly using a no-till small-plot cone seed drill starting on Oct. 8, 1997 and continued until November 6 (approx. 3 days prior to soil freeze-up). Phosphate fertilizer was side-banded as 11-51-0 at the time of seeding at a rate of 20 lbs P/acre. Weeds were controlled with one application of Roundup at 0.5 liters/acre during the first week of May. The plot was swathed Aug. 10, 1998 and harvested Aug. 25, 1998.

As shown in Table 1, plant populations of the unprotected check were significantly reduced when the canola was seeded earlier than Oct. 30, 1997. Yields of the unprotected check were comparatively low. However the Extender coated canola, which was protected from fall germination, produced an acceptable plant stand and no yield reduction at all seeding dates.

TABLE 1

Plant stand and yield at Edmonton Research Station.

| Seeding Date | Seed Coating | Plants/M$^2$ 4-June | Field (bu/ac) |
|---|---|---|---|
| 8-Oct | 1-Check | 0.3 | 4.6 |
| | 2- Extender | 15.0 | 45.2 |
| 16-Oct | 1- Check | 4.4 | 16.0 |
| | 2- Extender | 16.9 | 44.1 |
| 22-Oct | 1- Check | 5.3 | 36.2 |
| | 2- Extender | 18.2 | 43.8 |
| 30-Oct | 1 - Check | 51.0 | 45.9 |
| | 2- Extender | 23.5 | 52.3 |
| 6-Nov | 1- Check | 47.5 | 54.0 |
| | 2- Extender | 18.5 | 44.7 |

Scott, SK Agriculture & Agri-Food Canada

These field trials were conducted by Ken Kirkland and Eric Johnson. The research trial consisted of five coatings including a GuardCoat check, Extender and 3 other prospective 'fall seed' coatings on RoundupReady Quest canola. All seed was treated with Apron and sown on 5 dates beginning with Oct. 9, 1997 through to Nov. 3, 1997.

The trial design was a 4 replicate randomized complete block. The plot was seeded with a 6 row hoe drill and phosphate as 11-51-0 was placed with the seed at a rate of 20 lbs/acre actual P. Nitrogen was broadcast in late April at the rate of 100 lbs/acre of 46-0-0. Weeds were controlled with one application of Roundup at 0.5 liters/acre during the last week of April. The plots were swathed on Jul. 29, 1998 and the canola was combined Aug. 4, 1998.

Consistent with Example 1, this location produced acceptable plant stands and yields with Extender coated canola at all seeding dates, whereas the unprotected check produced an adequate plant stand on only the last date (Nov. 3, 1997). Other fall seed coatings demonstrated improved but not significant increases in over-winter survival of canola seeds. In all fall seeding dates the Extender coated canola outyielded the spring seeded check (Table 3).

TABLE 2

Plants/square meter - June 3, 1998.

| Seed Coating | 9-Oct | 14-Oct | 20-Oct | 27-Oct | 3-Nov |
|---|---|---|---|---|---|
| Check | 0.5 b | 0.3 b | 3.3 b | 5.8 a | 16.3 a |
| Extender | 16.3 a | 15.5 a | 14.8 a | 13.8 a | 14.0 a |
| Fall Seed 2 | 2.3 b | 4.8 b | 9.0 ab | 11.3 a | 11.8 a |
| Fall Seed 3 | 0 b | 3.8 b | 7.5 ab | 9.3 a | 15.3 a |
| Fall Seed 4 | 2.5 b | 3.3 b | 3.0 b | 4.5 a | 16.5 a |

TABLE 3

Yield of Quest Canola (kg/ha) Scott, SK - August 1998.

| Seed Coating | 9-Oct | 14-Oct | 20-Oct | 27-Oct | 3-Nov | 19-May |
|---|---|---|---|---|---|---|
| Guard Coat | 0.0 b | 0 c | 383.5 b | 532.5 b | 845.5 a | 741 |
| Extender | 1414.5 a | 1258.3 a | 990.3 a | 1111.5 a | 929.5 a | |
| Fall Seed 2 | 0 b | 0 c | 264.0 b | 518.8 b | 888.3 a | |
| Fall Seed 3 | 0 b | 0 c | 320.5 b | 617.8 b | 896.8 a | |
| Fall Seed 4 | 0 b | 663.5 b | 648.0 ab | 809.5 b | 957.5 a | |

What is claimed is:

1. A seed coated in a continuous, adherent water impervious coating to control germination until after exposure to freezing temperatures said coating comprising a water insoluble polymer having the following properties:
   i. a glassification temperature of about 20° C. to about 0° C.;
   ii. a water absorptivity value of at least 15% w/w after 24 hours; and,
   iii. a moisture vapor transmission rate of less than 200 gms per square meter per 24 hours; wherein the coating prevents the seed from imbibing water until the ambient temperature reaches the glassification temperature of the polymer and the absorbed water freezes and fractures the seed coating rendering it water permeable upon exposure to temperatures above 0° C.

2. A seed of claim 1 wherein the polymer has a glassification temperature of about 15° C.

3. A seed of claim 1 wherein the polymer has a water absorptivity value of at least 50% w/w.

4. A seed of claim 1 wherein the polymer has a water absorptivity value of at least 50% to 90% w/w.

5. A seed of claim 1 wherein the polymer has a moisture vapor transmission rate of about between 130 to 150 gms per square meter.

6. A seed of claim 1 wherein the moisture vapor transmission rate is less than 150 gms per square meter.

7. A seed of claim 1 wherein the polymer is selected from the group consisting of styrene-acrylics, styrene butadienes, styrene-nitrile butadienes and vinyl acetate ethylenes.

8. A seed of claim 7 wherein the polymer is a styrene butadiene.

9. A seed of claim 1 wherein the seed is selected from the group of seed consisting of Brassica spp. *Medicago sativa*, Melilotus spp., Trifolium spp., *Glycine max, Lens esculenta, Pisum sativum, Cicer arietinum,* Phaseolus spp., Triticum spp., Hordeum spp., *Secale cereale,* X Triticosecale Wittmack), *Carum carvi, Phalaris canatiensis, Coriandrum sativum* L., *Zea mays,* Avena spp. and Lolium spp.

10. A seed of claim 1 wherein the seed is further coated with a member of the group consisting of: Rhizobium inoculum, fungicide, fertilizer and insecticide.

11. A method of inhibiting germination in a seed by enveloping the seed in a continuous, water impervious coating comprising a water insoluble polymer having the following properties:
   i. a glassification temperature of about 12° C. to about 0° C.;
   ii. a water absorptivity value of at least 15% w/w after 24 hours; and,
   iii. a moisture vapor transmission rate of less than 200 gms per square meter per 24 hours;
   wherein the coating is present in an amount that prevents the seed from imbibing water until the ambient temperature reaches below the freezing temperature of water where the absorbed water freezes and fractures the seed coating rendering it water permeable upon exposure to temperatures above 0° C.

12. A method of claim 11 wherein the polymer has a glassification temperature of about 15° C.

13. A method of claim 11 wherein the polymer has a water absorptivity value of at least 50% w/w.

14. A method of claim 11 wherein the polymer has a water absorptivity value of at least 50% to 90% w/w.

15. A method of claim 11 wherein the polymer has a moisture vapor transmission rate of about between 130 to 150 gms per square meter.

16. A method of claim 11 wherein the polymer has a moisture vapor transmission rate is less than 150 gms per square meter.

17. A method of claim 11 wherein the polymer is selected from the group consisting of styrene-acrylics, styrene butadienes, styrene-nitrile butadienes and vinyl acetate ethylenes.

18. A method of claim 17 wherein the polymer is a styrene butadiene.

19. A method of claim 11 wherein the seed is selected from the group of seed consisting of Brassica spp. *Medicago sativa,* Melilotus spp., Trifolium spp., *Glycine max, Lens esculenta, Pisum sativum, Cicer arietinum,* Phaseolus spp., Triticum spp., Hordeum spp., *Secale cereale,* X Triticosecale Wittmack), *Carum carvi, Phalaris canatiensis, Coriandrum sativum* L., *Zea mays,* Avena spp. and Lolium spp.

20. A method of claim 11 wherein the seed is further coated with a member of the group consisting of: Rhizobium inoculum, fungicide, fertilizer and insecticide.

21. A method for fall planting of cool season plants said method comprising the step of planting seed in a field two weeks prior to the expected date of the first hard freeze wherein the seed is coated with a continuous water impervious film comprising a water insoluble polymer having the following properties:
   i. a glassification temperature of about 12° C. to about −4° C.;
   ii. a water absorptivity value of at least 15% w/w per 24 hours; and
   iii. a moisture vapor transmission rate of less than 200 gms per square meter per 24 hours.
   wherein the coating is present in an amount that prevents the seed from imbibing water until the ambient temperature reaches below the freezing temperature of water where the absorbed water freezes and fractures the seed coating rendering it water permeable upon exposure to temperatures above 0° C.

22. A method of claim 21 with the further step of permitting the seed to germinate in the spring when the soil is no longer frozen.

23. A method of claim 21 wherein the polymer has a glassification temperature of about 15° C.

24. A method of claim 21 wherein the polymer has a water absorptivity value of at least 50% w/w.

25. A method of claim 21 wherein the polymer has a water absorptivity value of at least 50% to 90% w/w.

26. A method of claim 21 wherein the polymer has a moisture vapor transmission rate of about between 130 to 150 gms per square meter.

27. A method of claim 21 wherein the polymer has a moisture vapor transmission rate is less than 150 gms per square meter.

28. A method of claim 21 wherein the polymer is selected from the group consisting of styrene-acrylics, styrene butadienes, styrene-nitrile butadienes and vinyl acetate ethylenes.

29. A method of claim 28 wherein the polymer is a styrene butadiene.

30. A method of claim 21 wherein the seed is selected from the group of seed consisting of Brassica spp. *Medicago sativa,* Melilotus spp., Trifolium spp., *Glycine max, Lens esculenta, Pisum sativum, Cicer arietinum,* Phaseolus spp., Triticum spp., Hordeum spp., *Secale cereale,* X Triticosecale Wittmack), *Carum carvi, Phalaris canatiensis, Coriandrum sativum* L., *Zea mays,* Avena spp. and Lolium spp.

31. A method of claim 21 wherein the seed is further coated with a member of the group consisting of: Rhizobium inoculum, fungicide, fertilizer and insecticide.

* * * * *